United States Patent
Yamashita et al.

(10) Patent No.: US 11,933,059 B2
(45) Date of Patent: Mar. 19, 2024

(54) FIBER SHEET FOR REINFORCING CONCRETE STRUCTURES

(71) Applicant: DENKA COMPANY LIMITED, Tokyo (JP)

(72) Inventors: Tomohiro Yamashita, Tokyo (JP); Hiroaki Nishimura, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 17/639,175

(22) PCT Filed: Aug. 26, 2020

(86) PCT No.: PCT/JP2020/032228
§ 371 (c)(1),
(2) Date: Feb. 28, 2022

(87) PCT Pub. No.: WO2021/039858
PCT Pub. Date: Mar. 4, 2021

(65) Prior Publication Data
US 2022/0403673 A1    Dec. 22, 2022

(30) Foreign Application Priority Data

Aug. 27, 2019  (JP) ................... 2019-155053

(51) Int. Cl.
| | | |
|---|---|---|
| *E04G 23/02* | (2006.01) | |
| *B32B 5/02* | (2006.01) | |
| *B32B 5/12* | (2006.01) | |
| *B32B 5/26* | (2006.01) | |
| *B32B 7/12* | (2006.01) | |
| *B32B 13/14* | (2006.01) | |
| *B32B 37/12* | (2006.01) | |
| *D06M 15/00* | (2006.01) | |

(52) U.S. Cl.
CPC .......... *E04G 23/0218* (2013.01); *B32B 5/028* (2013.01); *B32B 7/12* (2013.01); *B32B 13/14* (2013.01); *B32B 37/12* (2013.01); *B32B 5/12* (2013.01); *B32B 5/26* (2013.01); *B32B 2037/1253* (2013.01); *B32B 2250/02* (2013.01); *B32B 2260/021* (2013.01); *B32B 2260/046* (2013.01); *B32B 2262/101* (2013.01); *B32B 2307/54* (2013.01); *B32B 2307/718* (2013.01); *D06M 15/00* (2013.01); *E04G 2023/0251* (2013.01)

(58) Field of Classification Search
CPC ........ E04G 23/0218; E04G 2023/0251; B32B 5/028; B32B 5/12; B32B 7/12; B32B 2307/54; B32B 2307/718; B32B 2260/021; B32B 2260/046; B32B 13/14; B32B 2262/101; B32B 2250/021; B32B 2250/02; B32B 37/12; D06M 15/00
See application file for complete search history.

(56) References Cited

U.S. PATENT DOCUMENTS

2018/0311929 A1    11/2018    Mason et al.

FOREIGN PATENT DOCUMENTS

| JP | 2000-199208 A | | 7/2000 |
|---|---|---|---|
| JP | 2002-028922 A | | 1/2002 |
| JP | 2002-302877 A | | 10/2002 |
| JP | 2006-342538 A | | 12/2006 |
| JP | 2009-162033 A | | 7/2009 |
| JP | 2010-001707 A | | 1/2010 |
| JP | 2010-216144 A | | 9/2010 |
| JP | 2015-105367 A | | 6/2015 |
| JP | 2016033108 | * | 3/2016 |
| JP | 2016145139 | * | 8/2016 |
| JP | 2017186825 | * | 10/2017 |
| JP | 2018-053601 A | | 4/2018 |

OTHER PUBLICATIONS

Machine translation of JP 2009162033 (A); Matsuoka Shigeru; Date: Jul. 23, 2009.*
Nov. 17, 2020 International Search Report issued in International Patent Application No. PCT/JP2020/032228.
Mar. 1, 2022 International Preliminary Report on Patentability issued in Intentional Patent Application No. PCT/JP2020/032228.

* cited by examiner

*Primary Examiner* — Camie S Thompson
(74) *Attorney, Agent, or Firm* — Oliff PLC

(57) ABSTRACT

A method for reinforcing a concrete structure so as to have high substrate visibility and sufficient reinforcing performance. A fiber sheet for reinforcing a concrete structure, the sheet including: a framework in which a filament-based, multi-axial mesh sheet and a matrix resin are integrated, wherein the multi-axial mesh sheet has a base weight amount in a range of 500 g/m² to 1000 g/m².

18 Claims, No Drawings

FIBER SHEET FOR REINFORCING CONCRETE STRUCTURES

TECHNICAL FIELD

The present invention relates to a fiber sheet for reinforcing concrete structures.

BACKGROUND

Established concrete structures have been generally reinforced by removing damaged concrete, injecting reinforcer into cracks, and placing and lining concrete thereon. However, the operations are heavy and often carried out at a high place. There is a demand for simple operations.

Some methods have been proposed for forming FRP (Fiber Reinforced Plastic). The conventional processes include putting onto a portion to be reinforced a synthetic fiber product such as woven fabric, knitted fabric, and non-woven fabric, and applying and curing resin thereon.

The synthetic fiber product may be a fiber sheet, e.g., made of aramid fibers or carbon fibers.

However, the conventional methods have a defect that the surface of a concrete structure is covered by an opaque reinforcing layer such as resin and sheet materials, and the base of the reinforced structure is difficult to visually inspect from the outside. In recent years, after reinforcing the surface of a concrete structure, it is often necessary to monitor changes over time in the structure. The conventional methods cannot easily respond to the need.

The structure reinforced by the conventional methods has to remove a part of the existing reinforcing layer applied on the surface to make a window for visually inspecting the base from the outside.

However, if an inspection window is formed on the structure by the conventional methods, the strength of the portion decreases and the structure may deteriorate from the portion.

There are some conventional methods for reinforcing established concrete structures using an adhesive and a fiber mesh sheet such that the base of the structures can be visually observed from the outside. Patent Document 1 discloses a conventional reinforcing method comprising the steps of applying onto the surface of a concrete structure a 1-mm thick layer of acrylic resin which has the parallel light transmittance of 75% or more; and then applying nylon or vinylon fibers on the surface. Patent Document 2 discloses a conventional reinforcing-coating method comprising the steps of applying a transparent polyurethane resin solution onto the surface of a concrete structure and attaching a glass fiber sheet thereon; further applying a transparent polyurethane resin solution onto the glass fiber sheet to impregnate the solution into the sheet; and drying and curing the impregnated solution to obtain a transparent or translucent coating layer.

CITATION LIST

Patent Literature

Patent Document 1: Japanese Patent Laid-Open No. 2006-342538
Patent Document 2: Japanese Patent Laid-Open No. 2010-001707

SUMMARY OF INVENTION

Technical Problem

However, the conventional methods described in Patent Documents 1 and 2 merely aim to stop a deteriorated structure surface from peeling off pieces. Therefore, the conventional methods cannot obtain an FRP structure having high tensile strength, which is required to reinforce a concrete structure.

In view of the above problems, an object of the present invention is to provide a reinforcing method resulting in both high substrate (base) visibility and adequate reinforcing performance.

Solution to Problem

The present inventors have studied the problems and reached a fiber sheet comprising a multi-axial mesh sheet which has a base weight amount in a range of 500 g/m² to 1000 g/m², and matrix resin. The fiber sheet ensures the substrate visibility as well as an excellent reinforcing performance such as high tensile strength. The present inventors have thus completed the present invention.

The present invention may provide the following aspects 1 to 18:

Aspect 1. A fiber sheet for reinforcing a concrete structure, the sheet comprising:
a framework in which a filament-based multi-axial mesh sheet (A) and a matrix resin (B) are integrated,
wherein the multi-axial mesh sheet (A) has a base weight amount in a range of 500 g/m² to 1000 g/m².

Aspect 2. The fiber sheet according to aspect 1, wherein the multi-axial mesh sheet (A) has a mesh opening of 1 to 25 mm.

Aspect 3. The fiber sheet according to aspect 1 or 2, wherein the multi-axial mesh sheet (A) comprises a thermoplastic resin in at least one of the axial directions.

Aspect 4. The fiber sheet according to aspect 3, wherein the multi-axial mesh sheet (A) comprises the thermoplastic resin in an amount of 50 g/m² or less.

Aspect 5. The fiber sheet according to any one of aspects 1 to 4, wherein the multi-axial mesh sheet (A) is a glass fiber sheet of two or more axes, and wherein the glass fiber sheet at least contains:
12% or more by mass of $ZrO_2$, and
10% or more by mass of $R_2O$, where R is one or more selected from the group consisting of Li, Na, and K.

Aspect 6. The fiber sheet according to any one of aspects 1 to 5, wherein the matrix resin (B) comprises 50% by mass or more of a component including one or more selected from the group consisting of (meth)acrylic resin, vinyl ester resin, unsaturated polyester resin, urethane resin, urea resin, epoxy resin, and silicone resin.

Aspect 7. The fiber sheet according to any one of aspects 1 to 6, wherein an amount of the matrix resin (B) is 20 g/m² to 400 g/m².

Aspect 8. The fiber sheet according to any one of aspects 1 to 7, wherein a difference between refractive indices of the multi-axial mesh sheet (A) and the matrix resin (B) is 0.04 or less, as measured by using a 589 nm-wavelength light source according to "Method A" defined in Section 4.1 of JIS K 7142: 2014.

Aspect 9. The fiber sheet according to any one of aspects 1 to 8, wherein the fiber sheet has a mesh opening of 1 to 25 mm.

Aspect 10. A method for manufacturing a fiber sheet for reinforcing a concrete structure, the method comprising the steps of:

impregnating a matrix resin (B) into a filament-based, multi-axial mesh sheet (A), wherein the multi-axial mesh sheet (A) has a base weight amount in a range of 500 g/m$^2$ to 1000 g/m$^2$; and curing and/or immobilizing the impregnated matrix resin (B) by heat treatment and/or active energy ray irradiation treatment such that the multi-axial mesh sheet (A) and the matrix resin (B) are integrated into a fiber sheet.

Aspect 11. The method according to aspect 10, wherein the matrix resin (B) is a non-polymerizable high molecular weight substance, the method further comprising the steps of:

diluting the high molecular matrix resin (B) with an organic solvent (C), wherein the organic solvent (C) is capable of dissolving the matrix resin (B); and after the impregnating the matrix resin (B) into the multi-axial mesh sheet (A), volatilizing the organic solvent (C) by heat treatment.

Aspect 12. The method according to aspect 10, wherein the matrix resin (B) is a radical polymerizable resin, the method further comprising the steps of:

adding a thermal polymerization initiator (D-1) to the matrix resin (B), wherein the thermal polymerization initiator (D-1) is capable of generating a radical by heating; and after the impregnating the matrix resin (B) into the multi-axial mesh sheet (A), radically polymerizing the matrix resin (B) by heat treatment.

Aspect 13. The method according to aspect 10, wherein the matrix resin (B) is a radical polymerizable resin, the method further comprising the steps of:

adding a photopolymerization initiator (D-2) to the matrix resin (B) wherein the photopolymerization initiator (D-2) is capable of generating a radical by irradiating an active energy ray; and after the impregnating the matrix resin (B) into the multi-axial mesh sheet (A), radically polymerizing the matrix resin (B) by active energy ray irradiation treatment.

Aspect 14. The method according to any one of aspects 10 to 13, further comprising:

winding the fiber sheet into a roll.

Aspect 15. A method for reinforcing a concrete structure, the method comprising the steps of:

applying an adhesive (E) for concrete onto the fiber sheet according to any one of aspects 1 to 9 or a fiber sheet obtained by the method according to any one of aspects 10 to 14; and installing the fiber sheet on a surface of a concrete structure, then curing the adhesive (E) to form a reinforcing layer on the surface, wherein the reinforcing layer has a tensile strength of 150 kN/m or more per unit length, as measured by using a "B-type specimen" prepared by a process based on JIS A 1191: 2004.

Aspect 16. The method according to aspect 15, wherein the reinforcing layer has a total light transmittance of 5% or more, as measured by a process defined in JIS K 7375: 2008.

Aspect 17. The method according to aspect 15 or 16, wherein a difference between refractive indices of the multi-axial mesh sheet (A) and the adhesive (E) is 0.04 or less, as measured by using a 589 nm-wavelength light source according to "Method A" defined in Section 4.1 of JIS K 7142: 2014.

Aspect 18. The method according to any one of aspects 15 to 17, wherein the adhesive (E) comprises 50% by mass or more of a component including one or more selected from the group consisting of (meth)acrylic resin, vinyl ester resin, unsaturated polyester resin, urethane resin, urea resin, epoxy resin, and silicone resin.

Advantageous Effects of Invention

A fiber sheet provided by an embodiment of the present invention can be used for reinforcing a concrete structure, with maintaining high substrate visibility and obtaining sufficient reinforcing performance.

DESCRIPTION OF EMBODIMENT

In the present specification, any amounts (parts) and ratios (%) are based on mass unless otherwise defined. Numerical ranges in the present specification shall include the upper limit value and the lower limit value unless otherwise defined. In the present specification, the term "concrete" is a general term which embraces cement paste, mortar, and concrete, unless otherwise defined.

<Fiber Sheet for Reinforcing Concrete Structure>

An embodiment of the present invention may provide a fiber sheet for reinforcing concrete structure (hereinafter, also referred to as "fiber sheet"). The fiber sheet has a framework (or structure) in which a filament-based multi-axial mesh sheet (A) and a matrix resin (B) are integrated. The fiber sheet may be manufactured by impregnating the matrix resin (B) into the multi-axial mesh sheet (A); and curing and/or immobilizing the impregnated matrix resin (B) by heat treatment and/or active energy ray irradiation treatment such that the multi-axial mesh sheet (A) and the matrix resin (B) are integrated. The fiber sheet may combine with an adhesive for a concrete structure (described later) to form an FRP structure as a reinforcing layer.

<Multi-Axial Mesh Sheet (A)> base weight amount of the multi-axial mesh sheet (A) is 500 to 1000 g/m$^2$, preferably 500 to 800 g/m$^2$. If the base weight amount is less than 500 g/m$^2$, it is difficult to obtain enough tensile load performance for reinforcing a concrete structure. If the base weight amount is more than 1000 g/m$^2$, the matrix resin (B) is hard to impregnate, leading to poor substrate visibility.

The mesh opening of the multi-axial mesh sheet (A) may preferably be 1 to 25 mm, more preferably 2 to 10 mm. If the mesh opening is within the preferred range, the multi-axial mesh sheet can have excellent adhesion to a concrete structure, improve the FRP tensile strength, and prevent flame propagation.

The multi-axial mesh sheet (A) may preferably contains a thermoplastic resin in at least one of the axial directions. The thermoplastic resin may work in the form of a hot-melt coating yarn. The thermoplastic resin may contribute to adhere intersecting filaments to each other and prevent them from breaking up. The thermoplastic resin may include, but not limited to, polyvinyl chloride, polyethylene, polypropylene, polystyrene, (meth)acrylonitrile-butadiene-styrene, (meth)acrylonitrile-styrene, polymethyl (meth)acrylic, polyvinyl alcohol, polyvinylidene chloride, polyethylene terephthalate, polyamide (e.g., nylon), polyacetal, polycarbonate, polyphenylene ether, polybutylene terephthalate, ultrahigh-molecular weight polyethylene, polyvinylidene fluoride, polysulfone, polyethersulfone, polyphenylene sulfide, polyarylate, polyamideimide, polyetherimide, polyether ether ketone, polyimide, liquid crystal polymer, and polytetrafluoroethylene (Teflon(registered trademark)).

The multi-axial mesh sheet (A) may preferably contain the thermoplastic resin in the amount of 50 g/m$^2$ or less, more preferably 20 g/m$^2$ or less. If the content of the thermoplastic resin is 50 g/m$^2$ or less, the substrate visibility of the concrete structure improves.

The multi-axial mesh sheet (A) may preferably be biaxial or more-axial, more preferably a glass fiber sheet of two or more axes, further preferably a glass fiber sheet of two axes. If the multi-axial mesh sheet (A) is a biaxial glass fiber sheet, both the strength required for reinforcing the concrete structure and the substrate visibility of the concrete structure can improve.

The glass fiber sheet may be manufactured by any process. The biaxial glass fiber sheet may be produced by, for example, forming a fiber bundle from some long fibers such as glass yarn and glass roving; arranging the fiber bundles in the warp and the weft directions to intersect the fibers; and weaving or bonding the intersecting fibers.

The glass fiber may preferably contain 12% or more by mass of $ZrO_2$, and 10% or more by mass of $R_2O$, where R is one or more selected from the group consisting of Li, Na, and K. If the amounts of $ZrO_2$ and $R_2O$ are in the preferred ranges, the glass fiber sheet may be less likely to deteriorate by alkaline components derived from the concrete structure. The glass fiber may preferably contain 30% or less by mass of $ZrO_2$, and 25% or less by mass of $R_2O$.

The multi-axial mesh sheet (A) may further contain other components that are components other than the fibers or the thermoplastic resins. The other components may include long fibers composed of components other than glass, thermosetting resins, inorganic compounds, metals, or the combination thereof. Among these, the other components may preferably include a sizing agent or sizing material, which are aqueous solvent dispersions of urethane resin and acrylic resin. The content of the other components may preferably be 50 g/m$^2$ or less, more preferably less than 50 g/m$^2$. By setting the content of the other components to 50 g/m$^2$ or less, the substrate visibility can improve.

<Matrix Resin (B)>

By impregnating the multi-axial mesh sheet (A) with the matrix resin (B) to form a fiber sheet, the fiber sheet can enhance the substrate visibility of a concrete structure after the reinforcing layer is formed.

The matrix resin (B) may be any material as long as it can impregnate into the multi-axial mesh sheet (A). The matrix resin (B) may preferably contain 50% or more by mass of a component, which includes one or more selected from the group consisting of (meth)acrylic resin, vinyl ester resin, unsaturated polyester resin, urethane resin, urea resin, epoxy resin, and silicone resin. The matrix resin (B) may preferably include one or more selected from the group consisting of radically polymerizable resin and epoxy resin. The preferred component(s) may easily integrate with the multi-axial mesh sheet (A), and when used in the reinforcing method for a concrete structure (hereinafter, also simply referred to as "reinforcing method"), the substrate visibility can be excellent.

The matrix resin (B) may contain the resin(s) in the form of monomer, oligomer, or polymer, or the combination thereof.

The matrix resin (B) may further contain, unless the performance deteriorates, an additive e.g., including inorganic fillers, oils, rubbers, viscosity modifiers, pigments, dyes, plasticizers, polymerization initiators, sensitizers, catalysts, polymerization inhibitors, waxes, tackifiers, silane coupling material, antioxidants, flame retardants, or organic solvent.

The fiber sheet may preferably contain the matrix resin (B) in the amount of 20 g/m$^2$ to 400 g/m$^2$, more preferably 50 g/m$^2$ to 200 g/m$^2$. If the content of the matrix resin (B) is 20 g/m$^2$ or more, the resin can impregnate between fibers of the multi-axial mesh sheet (A), leading to an improved substrate visibility for the reinforcing method. If the content of the matrix resin (B) is 400 g/m$^2$ or less, the mass of the multi-axial mesh sheet (A) can reduce, and therefore the reinforcing method can further prevent falling the sheet off, leading to an improved workability.

<Fiber Sheet for Reinforcing Concrete Structure>

The difference between refractive indices of the multi-axial mesh sheet (A) and the matrix resin (B) may preferably be 0.04 or less, more preferably 0.025 or less, as measured by using a 589 nm-wavelength light source according to "Method A" defined in Section 4.1 of JIS K 7142: 2014. If the difference between the refractive indices is 0.04 or less, the sheet may contribute to improve the substrate visibility for the reinforcing method.

The fiber sheet may preferably have the mesh opening of 1 to 25 mm, more preferably 3 to 10 mm. If the mesh opening is within the range, the sheet may have an excellent adhesion to a concrete structure, leading to high reinforcing performance for the reinforcing method.

<Method for Manufacturing Fiber Sheet>

As described above, the fiber sheet may be manufactured by impregnating the multi-axial mesh sheet (A) with the matrix resin (B) in the state of fluid, then curing and/or immobilizing (or defluidizing) it.

In the case that the manufacturing method adopts heat treatment, for instance, the matrix resin (B) may be a non-polymerizable high molecular weight substance, and the matrix resin (B) is diluted with an organic solvent (C), which is capable of dissolving the matrix resin (B), to obtain a solution. The multi-axial mesh sheet (A) is impregnated with the solution, and then heated to volatilize the organic solvent (C) to integrate the matrix resin (B) and the multi-axial mesh sheet (A).

The viscosity of the solution obtained by diluting the matrix resin (B) with the organic solvent (C) may preferably be 2,000 mPa·s or less, more preferably 500 mPa·s or less at 23 degrees C. and 20 rpm, measured using a Brookfield rotational viscometer. If the viscosity is 2,000 mPa·s or less, the multi-axial mesh sheet (A) may be sufficiently impregnated, and the substrate visibility is improved for the reinforcing method. The viscosity may more preferably be 1 mPa·s or more at 23 degrees C. and 20 rpm.

The organic solvent (C) capable of dissolving the high molecular matrix resin (B) may be any organic solvent as long as it volatilizes by heating. The organic solvent (C) may include the combination of two or more solvents. Examples of heat-volatile organic solvents may include acetone, isobutyl alcohol, isopropyl alcohol (or 2-propanol), isopentyl alcohol (or isoamyl alcohol), ethyl ether, ethylene glycol monoethyl ether (or cellosolve), ethylene glycol monoethyl ether acetate (or cellosolve acetate), ethylene glycol mono-normal-butyl ether (or butyl cellosolve), ethylene glycol monomethyl ether (or methyl cellosolve), ortho-dichlorobenzene, xylene, cresol, chlorobenzene, isobutyl acetate, isopropyl acetate, isopentyl acetate (or isoamyl acetate), ethyl acetate, normal-butyl acetate, normal-propyl acetate, normal-pentyl acetate (or normal-amyl acetate), methyl acetate, cyclohexanol, cyclohexanone, N,N-dimethylformamide, tetrahydrofuran, 1,1,1-trichloroethane, toluene, normal-hexane, 1-butanol, 2-butanol, methanol, methyl ethyl ketone, methyl cyclohexanol, methyl cyclohexanone, methyl-normal-butyl ketone, gasoline, coal tar naphtha, petroleum ether, petroleum naphtha, petroleum benzine, turpentine oils, and mineral spirits.

The matrix resin (B) and the organic solvent (C) capable of dissolving the matrix resin (B) may be used in any mixing ratio. As an example, the amount of the organic solvent (C) may preferably be 200 parts by mass or less, more preferably 10 to 150 parts by mass, based on 100 parts by mass of the radical polymerizable resin.

As another example of adopting heat treatment, the matrix resin (B) may be a radical polymerizable resin in the form of fluid, and the matrix resin (B) is mixed with a thermal polymerization initiator (D-1) capable of generating a radical by heating. Then the resulting solution impregnates into the multi-axial mesh sheet (A), and the sheet is heated to radically polymerize and cure the matrix resin (B) to integrate the matrix resin (B) and the multi-axial mesh sheet (A). The thermal polymerization initiator (D-1) may be used in the amount of 0.1 to 10 parts by mass with respect to 100 parts by mass of the radical polymerizable resin.

The solution containing the matrix resin (B) as a radical polymerizable resin in the form of fluid and the thermal polymerization initiator (D-1) may preferably have the viscosity of 2,000 mPa·s or less, more preferably 500 mPa·s or less at 23 degrees C. and 20 rpm, as measured using a Brookfield rotational viscometer. If the viscosity is 2,000 mPa·s or less, the multi-axial mesh sheet (A) may be sufficiently impregnated, and the substrate visibility is improved for the reinforcing method. The viscosity may more preferably be 1 mPa·s or more at 23 degrees C. and 20 rpm.

The matrix resin (B) may contain a non-radical polymerizable resin.

The thermal polymerization initiator (D-1) is not limited as long as it generates a radical by heating. The thermal polymerization initiator (D-1) may include di-halogen, azo, or organic peroxide compounds, or the combination thereof. Among these, organic peroxide compounds are preferred, particularly one or more selected from the group consisting of cumene hydroperoxide and benzoyl peroxide.

The matrix resin (B) may further contain a reducing agent. If a reducing agent is used in combination with the thermal polymerization initiator (D-1) such as an organic peroxide, the reducing agent reduces the thermal polymerization initiator (D-1) to improve the reaction rate of radical polymerization and the physical properties of the polymerized matrix resin (B). Among the reducing agents, cobalt octylate is preferable.

The heat treatment may include any processes. For instance, a process for heating may comprise the steps of impregnating the matrix resin (B) into the multi-axial mesh sheet (A), and blowing the mesh sheet by hot air onto one side or both sides of the sheet to apply convective heat to the sheet. Alternatively, the heating process may comprise heating the sheet by using an infrared heater, or irradiating electromagnetic waves from a microwave irradiator to the sheet.

In the case that active energy ray irradiation is adopted, the matrix resin (B) may be a radical polymerizable resin in the form of fluid, and the matrix resin may be added a photopolymerization initiator (D-2) that generates radicals by active energy ray irradiation. The resulting solution impregnates into the multi-axial mesh sheet (A), and the impregnated solution is radically polymerized and cured by active energy ray irradiation to integrate the matrix resin (B) and the multi-axial mesh sheet (A).

The solution containing the matrix resin (B) as a radical polymerizable resin in the form of fluid and the photopolymerization initiator (D-2) may preferably have the viscosity of 2,000 mPa·s or less, more preferably 500 mPa·s or less at 23 degrees C. and 20 rpm, as measured using a Brookfield rotational viscometer. If the viscosity is 2,000 mPa·s or less, the multi-axial mesh sheet (A) may be sufficiently impregnated, and the substrate visibility is improved for the reinforcing method. The viscosity may more preferably be 1 mPa·s or more at 23 degrees C. and 20 rpm.

The photopolymerization initiator (D-2) is not limited as long as it generates a radical by irradiating an active energy ray. The photopolymerization initiator (D-2) may include alkylphenone derivatives, di-halogen, or azo compounds, or the combination thereof. Among these, alkylphenone derivatives are preferred, particularly 1-hydroxycyclohexyl phenyl ketone.

The matrix resin (B) may further contain a reducing agent. If a reducing agent is used in combination with the photopolymerization initiator (D-2), the reducing agent reduces the photopolymerization initiator (D-2) to improve the reaction rate of radical polymerization and the physical properties of the polymerized matrix resin (B). The amount of the photopolymerization initiator (D-2) may preferably be 0.1 to 10 parts by mass with respect to 100 parts by mass of the radical polymerizable resin.

The kind of active energy ray is not limited, and any energy source including an irradiator that selectively emits ultraviolet (UV) rays or electron beam (EB) can be used. The active energy ray irradiator may preferably include, for instance, a black light and a UV-LED light that are capable of emitting ultraviolet (UV) rays having wavelength of 365 nm. The matrix resin (B) may further contain a non-radical polymerizable resin.

A process for manufacturing the fiber sheet may preferably includes the step of winding up the fiber sheet into a roll. The winding step contributes not only to high portability, but also to make the fiber sheet be easily manufactured, so that the sheet can be suitably used at the site where the reinforcing method is performed.

The step of winding up the fiber sheet into a roll may further include the steps of laminating a release paper on the fiber sheet, and winding the release paper together with the sheet. The release paper may prevent blocking between the sheets.

In the manufacturing process of the fiber sheet, any facility may work for impregnating into the multi-axial mesh sheet (A) the matrix resin (B) in the form of fluid. Examples of the impregnating facility may include, for instance, a gravure coater, a dip coater, a comma coater, a top feed coater, a bar coater, a knife coater, a die coater, a reverse coater, an impregnation coater, a slot die coater, and a vacuum die coater. Among these, an impregnation coater is suitable because the multi-axial mesh sheet (A) has good impregnation properties for the matrix resin (B).

In the manufacturing process of the fiber sheet, the methods and the facilities for impregnating the multi-axial mesh sheet (A) with the matrix resin (B) may be any combination of two or more of those.

<Adhesive for Concrete Structure (E)>

An adhesive for a concrete structure (E) (hereinafter, also simply referred to as "adhesive (E)") may be applied onto the fiber sheet to integrate with it and make a reinforcing layer on the sheet.

An FRP sheet as a reinforcing layer made from a fiber sheet and adhesive (E) may preferably have the tensile strength of 150 kN/m or more, more preferably 175 kN/m or more per unit length, as measured by using a "B-type specimen" prepared by a process based on JIS A 1191: 2004. If the tensile strength is 150 kN/m or more, the present reinforcing method can exert a high reinforcing performance comparable to a conventional method for reinforcing a concrete structure using a carbon fiber sheet or an aramid fiber sheet.

The difference between the refractive indices of the multi-axial mesh sheet (A) and the adhesive (E) may preferably be 0.04 or less, more preferably less than 0.025, as measured by using a 589 nm-wavelength light source according to "Method A" defined in Section 4.1 of JIS K 7142: 2014. If the difference is 0.04 or less, the reinforcing method can further improve the substrate visibility.

The adhesive (E) may preferably comprises 50% by mass or more of a component including one or more selected from the group consisting of (meth)acrylic resin, vinyl ester resin, unsaturated polyester resin, urethane resin, urea resin, epoxy resin, and silicone resin. Among these, one or more of (meth)acrylic resin and epoxy resin is/are preferred as the adhesive (E). The resin may form an FRP with the fiber sheet to exhibit high tensile strength. Examples of the (meth) acrylic resin may include the same components as the matrix resin (B) which is radical polymerizable (meth)acrylic resin. The epoxy resin may include the mixture of 100 parts by mass of an epoxy compound and 10 to 100 parts by mass of a curing agent. Examples of the epoxy compound may include bisphenol-A type diglycidyl ether and the like. Examples of the curing agent may include amine-based curing agents such as modified amines.

The adhesive (E) may further contain, as long as the performance is not deteriorated, inorganic fillers, oils, rubbers, viscosity modifiers, pigments, dyes, plasticizers, polymerization initiators, sensitizers, catalysts, polymerization inhibitors, waxes, tackifiers, silane coupling material, antioxidants, flame retardants, or organic solvent.

The adhesive may be cured by any process. Examples of the curing process may include forming a coating film by volatilizing a volatile component; curing by reacting a resin component with moisture in the air; mixing a main agent with a curing agent (and optionally more component(s)) and curing the mixture by a chemical reaction; or applying to the adhesive an external energy such as heat or light to cure the adhesive. Among these, preferable is the mixing of two or more agents in terms of strength after construction and workability on the concrete surface.

The adhesive (E) may include the combination of two or more kinds of adhesives. It is possible to mix two or more adhesives prior to an application onto the working surface. Alternatively, it is also possible to apply the first adhesive on the working surface and then apply the second adhesive or more on the first.

The adhesive (E) may have any viscosity. The viscosity may preferably be 20,000 mPa·s or more at 23 degrees C. and 20 rpm, as measured using a Brookfield rotational viscometer, to easily apply onto the ceiling or wall surface of a concrete structure and form an enough thickness of a reinforcing layer.

<Reinforcing Layer>

In the reinforcing method according to an embodiment of the present invention, the reinforcing layer can be formed on the surface of a concrete structure by using the above-mentioned fiber sheet.

The reinforcing layer preferably has a total light transmittance of 5% or more, more preferably 15% or more, as measured by the method described in JIS K 7375: 2008. When the total light transmittance is 5% or more, sufficient substrate visibility can be obtained when used in the reinforcing method.

Prior to form the reinforcing layer, it may be preferable to carry out a treatment for process the substrate of the concrete structure if necessary. The substrate treatment may ensure the adhesiveness of the reinforcing layer for a long time period. The substrate treatment can remove laitances, stains, or weathered substrates from a concrete structure. The substrate treatment may use known techniques such as water jet, sandblast, sanding scraper, and wire brush.

Prior to form the reinforcing layer, it may be preferable to repair the section of a concrete structure if necessary to ensure the adhesiveness of the reinforcing layer. The section repairing material may include known materials such as concrete, mortar, cement paste, grout material, polymer cement mortar, and resin mortar, or the combination thereof.

Prior to form the reinforcing layer, it may be preferable to apply a primer on a concrete structure if necessary. By applying the primer may improve the adhesiveness between the concrete structure and the reinforcing layer, and also impregnate the primer into the weathered (e.g., cracked) concrete structure to restore the structure. The primer may inhibit an exudation of moisture, alkali metals, or gases from the concrete structure to ensure the performance of the reinforcing layer for a long time period. The primer may include known materials such as an acrylic resin-based primer, an epoxy resin-based primer, a vinyl ester resin-based primer, a silicone resin-based primer, and an inorganic primer, or the combination thereof. Among these, a material having the Gardner color scale of 8 or less is preferable. The amount of the primer applied may vary depending on the state of a concrete structure, but generally may be in the range of 0.05 to 1.0 kg/m$^2$. The primer may be applied by using known techniques such as a roller, brush, trowel, spatula, and spray coating.

Prior to form the reinforcing layer, it may be preferable to adjust the unevenness of a concrete structure if necessary. By adjust the unevenness of the structure in advance, the reinforcing layer can be uniformly applied to a large area of the surface of the structure to ensure the reinforcing performance over the large area. The unevenness adjusting material may include known materials such as resin mortar and polymer cement mortar containing resin and aggregate, or the combination thereof. Among these, a material having the Gardner color scale of 8 or less is preferable. The amount of the unevenness adjusting material applied may vary depending on the state of a concrete structure, but generally may be less than 1.8 kg/m$^2$. The unevenness adjusting material may be applied by using known techniques such as a trowel, spatula, and spray coating.

The reinforcing layer may be formed by curing a liquid adhesive (E) to fixing a fiber sheet for reinforcing a concrete structure. The liquid adhesive (E) may be applied by using known techniques such as a roller, brush, trowel, spatula, and spray coating. After applying the liquid adhesive (E), the fiber sheets are continuously attached to each other before curing, and the adhesive (E) impregnates into the fiber sheets to form an FRP for exhibiting reinforcing performance. The adhesive (E) may be applied for all processes at once, or may be applied in two or more steps. It may be preferable to apply an enough amount of the adhesive (E) to a structure in two or more steps to prevent dripping of the material and to form an FRP sheet. The amount of the adhesive (E) applied may preferably be 0.2 to 2.0 kg/m$^2$, more preferably 0.5 to 1.4 kg/m$^2$, per fiber sheet. If the amount of applied adhesive is 0.2 kg/m$^2$ or more, the fiber sheet can be appropriately fixed. If the amount of applied adhesive is 2.0 kg/m$^2$ or less, the substrate visibility may improve after the reinforcing.

The fiber sheets may laminate by any process. The fiber sheets may preferably laminate by using a defoaming roller to remove air bubbles in an adhesive (E) or the fiber sheets to easily impregnate the adhesive (E) into the fiber sheets and obtain an enough substrate visibility after the reinforcing.

The reinforcing layer may be formed from a laminate of two or more fiber sheets, preferably a laminate of two fiber sheets. By laminating two or more fiber sheets, it may be possible to exhibit a reinforcing performance as the same as the conventional carbon fiber sheet or aramid fiber sheet. Two or more fiber sheets may be attached to the surface once or one by one. It is preferable to attach the fiber sheets one by one in two or more times to prevent the fiber sheet from falling off the surface due to its weight.

The reinforcing layer may further use known techniques such as anchor pins and anchor bolts to prevent the fiber sheet from falling off the surface. Any number of anchor pins or bolts may be used, but it may be preferable to use the anchor pins or bolts for an area which is less than 20%, more preferably less than 10% of the total area of the reinforcing layer, in consideration of the substrate visibility.

The outer surface of the reinforcing layer may be further coated by a protective layer. The protective layer may be formed by applying a protective paint.

The protective paint may be cured by any process. Examples of the curing process may include forming a coating film by volatilizing a volatile component; curing by reacting a resin component with moisture in the air; mixing two or more components, and curing the mixture by a chemical reaction; or applying to the paint an external energy such as heat or light to cure it.

The amount of the protective coating applied may preferably be in the range of 0.01 to 1.0 kg/m$^2$, more preferably 0.02 to 0.2 kg/m$^2$, in terms of solid content. The protective coating may be applied by using known techniques such as a roller, brush, trowel, spatula, and spray coating.

In some embodiments, an additional layer other than the reinforcing layer may be formed. The additional layer may be made from a paint, adhesive, fiber sheet, film, resin molded product, or the combination thereof.

In a preferred embodiment, the reinforcing layer obtained by the above-mentioned reinforcing method may pass the gas toxicity test defined in the fireproof performance test/evaluation work method manual based on the Building Standard Law of Japan. The gas toxicity test uses a plurality of mice, and the reinforcing layer may preferably have 6.8 minutes or more of the average time until the mice faint away from the beginning of the test (hereinafter, the time is simply referred to as "average time."). If the average time is within the above range, the reinforcing layer is less likely to generate harmful combustion gas even in a tunnels fire, and evacuees is less likely to be caught in the harmful combustion gas. If so, the reinforcing layer is likely to save the evacuee's life and suitable for use in tunnels.

In a preferred embodiment, the reinforcing layer obtained by the above-mentioned reinforcing method may pass the spread-of-flame test defined in the NEXCO test method 738. The reinforcing layer may preferably have the quenching time of 30 seconds or less and the length of combusting fire is less than 600 mm from the ignition point, as measured by the test. If the reinforcing layer passes the test, the reinforcing layer is less likely to spread flame even in a tunnels fire. If so, the reinforcing layer is likely to save the evacuee's life and suitable for use in tunnels.

EXAMPLES

Hereinafter, examples of the present invention will be described, but the present invention is not limited to these examples.

<Multi-Axial Mesh Sheet>

Materials were used according to Table 1 below. The raw material (yarns) were bundled with glue (and optionally nylon fiber as the heat-sealing yarn if included), and added a sizing agent (noted as "other" in the table) to obtain a beam. The sizing agent was an emulsion containing a vinylsilane-based silane coupling agent. The beam was cut sequentially and sewn to either uniaxial, biaxial or triaxial. Then the sewn yarns were degreased, subjected to a surface treatment, and wound into a roll to obtain a multi-axial mesh sheet (No. 1-1 to 1-13 of Table 1). The mesh opening of each multi-axial mesh sheet was measured by a caliper. The results are shown in the table below. The refractive index of each obtained multi-axial mesh sheet was measured by using a 589-nm wavelength light source, according to "Method A" defined in Section 4.1 of JIS K 7142: 2014. The results are shown in the table below.

TABLE 1

Table 1

| | Formulation of multi-axial mesh sheet (A) | | | | | | | |
|---|---|---|---|---|---|---|---|---|
| | base weight | | beam formulation [g/m$^2$] | | | mesh | | |
| | amount [g/m$^2$] | sheet material | fiber material | hot-melt coating yarn | other | weaving type | opening [mm] | refractive index |
| 1-1 | 700 | glass fiber yarn | 680 | 15 | 5 | bi-axial | 2 | 1.57 |
| 1-2 | 700 | glass fiber yarn | 480 | 15 | 5 | bi-axial | 2 | 1.57 |
| 1-3 | 1000 | glass fiber yarn | 980 | 15 | 5 | bi-axial | 2 | 1.57 |
| 1-4 | 400 | glass fiber yarn | 380 | 15 | 5 | bi-axial | 2 | 1.57 |
| 1-5 | 1100 | glass fiber yarn | 1080 | 15 | 5 | bi-axial | 2 | 1.57 |
| 1-6 | 700 | glass fiber yarn | 600 | 15 | 85 | bi-axial | 2 | 1.57 |
| 1-7 | 700 | glass fiber yarn | 600 | 85 | 15 | bi-axial | 2 | 1.57 |
| 1-8 | 700 | glass fiber yarn | 680 | 15 | 5 | mono-axial | 2 | 1.57 |
| 1-9 | 700 | glass fiber yarn | 680 | 15 | 5 | tri-axial | 2 | 1.57 |
| 1-10 | 700 | glass fiber yarn | 680 | 15 | 5 | bi-axial | 0.5 | 1.57 |

TABLE 1-continued

Table 1

| | Formulation of multi-axial mesh sheet (A) | | | | | | |
|---|---|---|---|---|---|---|---|
| | base weight | | beam formulation [g/m$^2$] | | | mesh | |
| | amount [g/m$^2$] | sheet material | fiber material | hot-melt coating yarn | other | weaving type | opening [mm] | refractive index |
| 1-11 | 700 | glass fiber yarn | 680 | 15 | 5 | bi-axial | 30 | 1.57 |
| 1-12 | 685 | glass fiber yarn | 680 | 0 | 5 | bi-axial | 2 | 1.57 |
| 1-13 | 700 | polyester fiber yarn | 680 | 15 | 5 | bi-axial | 30 | 1.59 |

<Glass Fiber>
In the above multi-axial mesh sheets of glass fiber yarns, the yarns were prepared by melting the glass fibers shown in Table 2 and spinning it. In Table 2, the "other" component was impurities, mainly $Al_2O_3$.

TABLE 2

Table 2

| | Formulation of glass fibers [mass ratio] | | | | | |
|---|---|---|---|---|---|---|
| | $SiO_2$ | $ZrO_2$ | $Li_2O$ | $Na_2O$ | $K_2O$ | other |
| 2-1 | 78 | 12 | 10 | 0 | 0 | 0 |
| 2-2 | 78 | 12 | 0 | 10 | 0 | 0 |
| 2-3 | 78 | 12 | 0 | 0 | 10 | 0 |
| 2-4 | 76 | 12 | 4 | 4 | 4 | 0 |
| 2-5 | 56 | 16 | 16 | 0 | 0 | 12 |
| 2-6 | 52 | 16 | 12 | 0 | 0 | 20 |
| 2-7 | 56 | 10 | 10 | 0 | 0 | 24 |
| 2-8 | 56 | 10 | 0 | 10 | 0 | 24 |
| 2-9 | 56 | 10 | 0 | 0 | 10 | 24 |
| 2-10 | 56 | 12 | 8 | 0 | 0 | 24 |
| 2-11 | 56 | 12 | 0 | 8 | 0 | 24 |
| 2-12 | 56 | 12 | 0 | 0 | 8 | 24 |
| 2-13 | 44 | 10 | 8 | 0 | 0 | 38 |

<Matrix Resin>
Used were the commercially available, monomer- or polymer-based products shown in Table 3 below to obtain the matrix resin examples Nos. 3-1 to 3-9. The matrix resin was integrated with the above-mentioned multi-axial mesh sheet (A) by the manufacturing method shown in the table to form a fiber sheet. The visibility of the impregnating solution was measured at 23 degrees C. and 20 rpm using a Brookfield rotational viscometer. The results are shown in the table below.

<Acrylic Resin Polymer A>
100 parts by mass of benzyl acrylate ("Viscoat #160" manufactured by Osaka Organic Chemical Industry Ltd.) and 2 parts by mass of benzoyl peroxide suspension solution ("NYPER NS" manufactured by NOF Corporation) were mixed and heated at 120 degrees C. for 10 minutes to obtain acrylic resin polymer A.

<Acrylic Resin Polymer B>
100 parts by mass of cyclohexyl acrylate ("Viscoat #155" manufactured by Osaka Organic Chemical Industry Ltd.) and 2 parts by mass of benzoyl peroxide suspension solution ("NYPER NS" manufactured by NOF Corporation) were mixed and heated at 120 degrees C. for 10 minutes to obtain acrylic resin polymer B.

<Acrylic Resin Monomer>
Benzyl acrylate (Viscoat #160 manufactured by Osaka Organic Chemical Industry Ltd.) was used.

<Vinyl Acetate Resin>
A one-component curable adhesive (vinyl acetate resin emulsion adhesive curable by volatilization of water; "CH18" manufactured by Konishi Co., Ltd.) was used as it was in the product package.

TABLE 3

Table 3

| | | | Matrix resin (B); formulation and properties | | | | | | | | |
|---|---|---|---|---|---|---|---|---|---|---|---|
| | | | 3-1 | 3-2 | 3-3 | 3-4 | 3-5 | 3-6 | 3-7 | 3-8 | 3-9 |
| Matrix resin (B) | Ingredient [mass ratio] | acrylic resin polymer A | 100 | 60 | 40 | 0 | 100 | 100 | 0 | 0 | 80 |
| | | acrylic resin polymer B | 0 | 0 | 0 | 100 | 0 | 0 | 0 | 0 | 0 |
| | | acrylic resin monomer | 0 | 0 | 0 | 0 | 0 | 0 | 100 | 100 | 20 |
| | | vinyl acetate resin | 0 | 40 | 60 | 0 | 0 | 0 | 0 | 0 | 0 |
| | properties | refractive index | 1.56 | 1.55 | 1.54 | 1.51 | 1.56 | 1.56 | 1.56 | 1.56 | 1.56 |
| | | amount impregnating in multi-axial mesh sheet (A) [g/m$^2$] | 100 | 100 | 100 | 100 | 15 | 250 | 100 | 100 | 100 |
| Prcess of preparing fiber sheet for reinforcing concrete structure | | | | | (†3-1) | | | | (†3-2) | (†3-3) | (†3-4) |
| Amount of organic solvent (C) [g] with respect to grams of (B) | | | 100 | 300 | 100 | 20 | 100 | 100 | 0 | 0 | 20 |
| Amount of thermol polymerization initiator (D-1) [g] with respect to 100 grams of (B) | | | 0 | 0 | 0 | 0 | 0 | 0 | 2 | 0 | 2 |
| Amount of photopolymerization initiator (D-2) [g] with respect to 100 grams of (B) | | | 0 | 0 | 0 | 0 | 0 | 0 | 0 | 2 | 0 |
| Viscosity of [(B) + [(C) or (D-1) or (D-2)]] [mPa · s] | | | 50 | 60 | 65 | 1200 | 50 | 50 | 35 | 35 | 110 |

The manufacturing method shown in Table 3 above is as follows. The fiber sheet for reinforcing the concrete structure was produced by the following process. The mesh opening of the fiber sheet was measured with a caliper and the results are shown in Table 5 below.

(†3-1) Process of diluting organic solvent (C) and volatilizing it The matrix resin (B) was diluted with the amount shown in Table 3 of organic solvent (C) (acetone manufactured by Daishin Chemical Co., Ltd.) to obtain an impregnating solution. The multi-axial mesh sheet (A) of 1 meter width X 30 meters length was sequentially drawn from a roll. The diluted matrix resin was put into a dip coater to dip onto the mesh sheet so that the target mass was the solid content of the matrix resin (B). Then the excess matrix resin was squeezed by the roll. The sheet was heated at 120 degrees C. in an infrared heater for 5 minutes to volatilize the organic solvent (C). After that, a PET film was put onto the sheet surface to prevent the sheet surface from contacting with each other. The sheet with the PET film was wound again in a roll shape to prepare a fiber sheet.

(†3-2) Process of adding thermal polymerization initiator (D-1) and thermal polymerization The matrix resin (B) was added benzoyl peroxide suspension solution ("NYPER NS" manufactured by NOF Corporation) as thermal polymerization initiator (D-1) in the amount shown in Table 3 to obtain an impregnating solution. The multi-axial mesh sheet (A) of 1 meter width X 30 meters length was sequentially drawn from a roll. The mixture of the matrix resin and the thermal polymerization initiator was put into a dip coater to dip onto the mesh sheet to reach the target mass. Then the excess matrix resin was squeezed out by the roll. The sheet was heated at 120 degrees C. in an infrared heater for 5 minutes to polymerize the matrix resin (B). After that, a PET film was put onto the sheet surface to prevent the sheet surface from contacting with each other. The sheet with the PET film was wound again in a roll shape to prepare a fiber sheet.

(†3-3) Process of adding photopolymerization initiator (D-2) and irradiating active energy ray The matrix resin (B) was added Irgacare 184 manufactured by IGM Resins B.V. as photopolymerization initiator (D-2) in the amount shown in Table 3 to obtain an impregnating solution. The multi-axial mesh sheet (A) of 1 meter width X 30 meters length was sequentially drawn from a roll. The mixture of the matrix resin and the photopolymerization initiator was put into a dip coater to dip onto the mesh sheet to reach the target mass. Then the excess matrix resin was squeezed out by the roll. The sheet was sandwitched by peelable PET films to prevent oxygen as a polymerization inhibitor. The sheet was irradiated by an UV-LED light source for 5 minutes to carry out radical polymerization. The UV light had the peak emission wavelength of 355 nm and the illuminance of 1.1 mW/cm² on the sheet surface. The sheet with the PET film was wound again in a roll shape to prepare a fiber sheet.

(†3-4) Combined Process

A fiber sheet was obtained in the same manner by using the above methods (†3-1) and (†3-2) in combination.

<Adhesive for Concrete Structures>

Adhesive (E) was prepared by using one or more of commercially available or monomer-based synthetic adhesives shown in Table 4 below. The refractive index of each adhesive was measured by using a 589 nm-wavelength light source according to "Method A" defined in Section 4.1 of JIS K 7142: 2014. The results are shown in the table below.

TABLE 4

Table 4
Adhesive for concrete structure

| | | Adhesive for concrete structure (E) [mass ratio] | | | | | | |
|---|---|---|---|---|---|---|---|---|
| | | 4-1 | 4-2 | 4-3 | 4-4 | 4-5 | 4-6 | 4-7 |
| Ingredients contained in adhesive | acrylic adhesive A | 100 | 0 | 0 | 0 | 0 | 40 | 40 |
| | acrylic adhesive B | 0 | 0 | 0 | 0 | 100 | 0 | 0 |
| | epoxy adhesive | 0 | 100 | 0 | 0 | 0 | 60 | 0 |
| | vinyl acetate adhesive | 0 | 0 | 100 | 0 | 0 | 0 | 60 |
| | water glass | 0 | 0 | 0 | 100 | 0 | 0 | 0 |
| Properties | refractive index | 1.55 | 1.56 | 1.48 | 1.51 | 1.51 | 1.56 | 1.53 |

<Acrylic Adhesive A>

100 parts by mass of benzyl acrylate ("Viscoat #160" manufactured by Osaka Organic Chemical Industry Ltd.), 2 parts by mass of cumene hydroperoxide ("PERCUMYL H" manufactured by NOF Corporation), and 2 parts by mass of cobalt octylate (manufactured by Osaki Industry Co., Ltd.) were mixed to obtain a resin composition as acrylic adhesive A, capable of curing by a redox polymerization.

<Acrylic Adhesive B>

100 parts by mass of cyclohexyl acrylate ("Viscoat #155" manufactured by Osaka Organic Chemical Industry Ltd.), 2 parts by mass of cumene hydroperoxide ("PERCUMYL H" manufactured by NOF Corporation), and 2 parts by mass of cobalt octylate (manufactured by Osaki Industry Co., Ltd.) were mixed to obtain a resin composition as acrylic adhesive B, capable of curing by a redox polymerization.

<Epoxy Adhesive>

100 parts by mass of bisphenol A diglycidyl ether ("jER828" manufactured by Mitsubishi Chemical Corporation) and 60 parts by mass of modified amine ("ST11" manufactured by Mitsubishi Chemical Corporation) were mixed to obtain a resin composition as epoxy adhesive, capable of curing by a polyaddition reaction of glycidyl group and amino group.

<Vinyl Acetate Adhesive>

A one-component curable adhesive (vinyl acetate resin emulsion adhesive curable by volatilization of water; "CH18" manufactured by Konishi Co., Ltd.) was used as it was in the product package.

<Water Glass>

Used was No. 3 water glass defined in JIS K 1408: 1966 (manufactured by Fuji Chemical Industry Co., Ltd.), capable of curing by volatilization of water.

<Implementation of Reinforcing Method>

Test base materials to have a reinforcing layer thereon were prepared by the following process.

Test base materials: (1) Mortar specimen for evaluating substrate visibility, in accordance with JIS R 5201: 2015

A mortar test plate of 150 mm×70 mm X 10 mm was prepared by a process based on "Method for preparing sample" disclosed in Section 11.5 of JIS R 5201: 2015. The adherend surface (150 mm×70 mm) of the test plate was scraped by a #150 paper sander to remove laitances therefrom, and cleaned by air blowing to remove dust particles. Three crack patterns of 0.2 mm width, 0.5 mm width, and 1.0 mm width were written with a black HB pencil along the longitudinal direction on the adherend surface. Hereinafter, the test plate is also referred to as "mortar specimen for evaluating substrate visibility."

(2) Mortar specimen for evaluating alkali proof, in accordance with JIS R 5201: 2015

A mortar test plate of of 150 mm×70 mm×10 mm was prepared by a process based on "Method for preparing sample" disclosed in Section 11.5 of JIS R 5201: 2015. The adherend surface (150 mm×70 mm) of the test plate was scraped by a #150 paper sander to remove laitances therefrom, and cleaned by air blowing to remove dust particles. Hereinafter, the test plate is also referred to as "mortar specimen for evaluating alkali proof."

(3) Concrete flat plate for evaluating workability and concrete adhesiveness, in accordance with JIS A 5371: 2016

A concrete flat plate of 300 mm×300 mm×60 mm was prepared by a process in conformity to the disclosure of pavement and boundary block flat plates in Annex B "regulation" of JIS A 5371: 2016. The adherend surface (300 mm×300 mm) of the flat plate was scraped by a #150 paper sander to remove laitances therefrom, and cleaned by air blowing to remove dust particles. Hereinafter, the flat plate is also referred to as "concrete flat plate."

(4) Specimen for evaluating FRP strength

In accordance with JIS A 1191: 2004, described later.

(5) Calcium silicate plate for evaluating gas toxicity, in accordance with JIS A 5430: 2018

A calcium silicate plate of 220 mm×220 mm×10 mm was provided according to "Type 2" defined in JIS A 5430: 2018. The adherend surface (220 mm×220 mm) of the plate was cleaned by air blowing to remove dust particles.

(6) Calcium silicate plate for evaluating flame propagation, in accordance with JIS A 5430: 2018

A calcium silicate plate of 900 mm×600 mm×12 mm was provided according to "Type 2" defined in JIS A 5430: 2018. The adherend surface (900 mm×600 mm) of the plate was cleaned by air blowing to remove dust particles.

With the combination of the multi-axial mesh sheet, the matrix resin, and the adhesive shown in Table 5 below, the reinforcing layers according to Examples 1 to 39 and Comparative Examples 1 to 4 were placed on any of the above test specimens.

First, a fiber sheet was prepared from the combination of the multi-axial mesh sheet and the matrix resin shown in Table 5. See also Tables 1 to 3. Table 5 also illustrates the number of laminated multi-axial mesh sheets.

Among the reinforcing performances shown in Table 5, the test specimens for evaluating substrate visibility, alkali proof, workability, concrete adhesiveness, gas toxicity, and flame propagation were formed by the following procedure.

As a primer, an acrylic crack-repairing impregnant ("Denka DK550-003R" manufactured by Denka Company Limited.) was applied onto each specimen by a roller such that the coating amount was 0.15 kg/m².

After applying the primer, the specimen was left for 15 minutes. Then a reinforcing layer was formed on the specimen by the following steps. First, the adhesive shown in Tables 4 and 5 was applied onto the specimen by a rubber spatula or metal trowel such that the coating amount was 0.6 kg/m². Immediately, the fiber sheet was adhered to the specimen, and squeezed by a deforming roller to impregnate the adhesive into the fiber sheet.

Then the adhesive shown in Tables 4 and 5 was applied as a topcoat to the specimen by a rubber spatula or metal trowel such that the coating amount was 0.6 kg/m². The specimen was cured at 20 degrees C. for 24 hours to form a reinforcing layer.

Among the reinforcing performances, the test specimen for evaluating FRP strength was formed by the following procedure.

According to the process for producing "B-type test piece" defined in JIS A 1191: 2004, the adhesive shown in Tables 4 and 5 was poured into a mold so as to have the thickness of 2 mm. The fiber sheet shown in Tables 1, 2, and 5 was placed in the center along the thickness direction. Then the specimen was cured at 20 degrees C. for 7 days, and attached a metal tab for tensile test (SPCC test piece) by an acrylic adhesive for steel sheet ("DKP63" manufactured by Denka Company Limited.) to prepare a specimen for evaluating FRP strength.

<Evaluations of Reinforcement Performance>

As evaluations of reinforcement performance, as shown in Table 5, substrate visibility, alkali proof, workability, concrete adhesiveness, FRP strength, gas toxicity, and flame propagation were evaluated. The evaluation results are all shown in Table 5.

<Evaluation of Substrate Visibility>

After forming the reinforcing layer, the cracks written on the substrate were visually observed and evaluated according to the following criteria.

Good: The 0.2 mm and 0.5 mm cracks were visually confirmed over the entire area.

Fair: The 0.5 mm crack was visually confirmed over the entire area, but some or all of the 0.2 mm crack was not visually confirmed.

NG: Some or all of the 0.2 mm and 0.5 mm cracks were not visually confirmed.

<Evaluation of Alkali Proof>

A specimen was prepared by forming a reinforcing layer on a mortar piece. The specimen was submerged into a saturated calcium hydroxide solution for 28 days. Then the specimen was salvaged and immediately visually reviewed whether there was any changes on the surface, according to the following criteria.

Good: The reinforcing layer had no discoloration, crack, peeling, swelling, fissure, or outflow or the like.

Fair: The reinforcing layer had some discoloration, crack, peeling, swelling, fissure, or outflow or the like.

<Evaluation of Workability>

A reinforcing layer was formed on the concrete flat plate. The 300 mm×60 mm surface of the plate was brought into contact with the ground, and the adherend surface (i.e., the surface having the reinforcing layer thereon) was installed so as to be perpendicular to the ground. The state of the surface was visually observed from the beginning of the formation of the reinforcing layer to the completion of curing. Then the state was evaluated according to the following criteria.

Good: The surface had not any defects such as peeling, slipping, or falling of the sheet, and resin dripping.

Fair: The surface had slight slipping of the sheet or resin dripping.

NG: The surface had serious defects e.g., peeling, dropping, or severe slipping of the sheet, or resin dripping.

<Evaluation Concrete Adhesiveness>

A steel jig of 40 mm×40 mm was attached to the outermost surface of the formed reinforcing layer by an acrylic resin mortar adhesive ("Denka Dyna N" manufactured by Denka Company Limited.). Then a cut was made into the reinforcing layer to the concrete flat plate along the outline of the jig. The jig was pulled perpendicularly to the attachment surface by using a MKS tensile adhesion tester to measure the adhesion strength [N/mm²]. The result was evaluated according to the following criteria.

Good: 2.0 N/mm² or more; conformed to the standard "medium corrosion protection type C" of surface repair procedure according to the repair manual of Hanshin Expressway Company Limited.

Fair: 1.5 N/mm² or more and less than 2.0 N/mm²; conformed to the standard for the NEXCO bridge structure fall prevention method.

NG: less than 1.5 N/mm².

<Evaluation of FRP Strength>

The FRP strength test was carried out in accordance with JIS A 1191: 2004 to calculate the FRP tensile load [kN]. The FRP tensile strength per unit length [kN/m] was calculated according to the following formula 1.

FRP tensile strength per unit length [kN/m]=FRP tensile load [kN]*the number of fiber bundles in the test specimen [pieces]/the number of fiber bundles arranged in the tensile direction per 1 meter width of the fiber sheet [piece/m].   Formula 1

Furthermore, in order to estimate the FRP strength in the reinforcing layer, a converted FRP tensile strength [kN/m] was calculated by multiplying the FRP tensile strength per unit length [kN/(m*piece)] according to Formula 1 by the number of fiber sheets bonded in the reinforcing layer [piece], as the following Formula 2.

Converted FRP tensile strength [kN/m]=FRP tensile load per unit length calculated by Formula 1 [kN/(m*piece)]*the number of fiber sheets laminated [piece].   Formula 2

The FRP tensile strength was evaluated according to the following criteria.

Good: Converted FRP tensile strength [kN/m] was 350 kN/m or more.

Fair: Converted FRP tensile strength [kN/m] was 300 kN/m or more and less than 350 kN/m.

NG: Converted FRP tensile strength [kN/m] was less than 300 kN/m.

<Evaluation Gas Toxicity>

The gas toxicity test was used mice and evaluated according to the fireproof performance test/evaluation work method manual based on the Building Standard Law of Japan. The average time $X_s$ until the mice faint away from the beginning of the test was measured. The fireproof performance test/evaluation work method manual include a manual published by Japan Testing Center for Construction Materials (JTCCM).

Good: $X_s$ was 7.2 minutes or more.

Fair: $X_s$ was 6.8 minutes or more and less than 7.2 minutes.

NG: $X_s$ was less than 6.8 minutes.

<Evaluation Method of Flame Propagation>

The spread-of-flame test defined in the NEXCO test method 738 was used to measure the quenching time and the length of combusting fire from the ignition point. The result was evaluated by the following criteria.

Good: The quenching time was 10 seconds or less, and the length of combusting fire was less than 500 mm from the ignition point.

Fair: The quenching time was 30 seconds or less, and the length of combusting fire was less than 600 mm from the ignition point.

NG: The quenching time was more than 30 seconds, or the length of combusting fire was 600 mm or more from the ignition point.

TABLE 5

Table 5

| | Formulation of reinforcing layer | | | | | | |
|---|---|---|---|---|---|---|---|
| | fiber sheet for reinforcing concrete structures | | | | | | |
| | multi-axial mesh sheet (A) | formulation of glass fiber | number of laminated glass fiber sheets | matrix resin (B) | mesh opening after forming sheet [mm] | adhesive (E) for concrete structures | Reinforcing performance substrate visibility |
| Example 1 | 1-1 | 2-1 | 2 | 3-1 | 3 | 4-1 | Good |
| Example 2 | 1-1 | 2-1 | 1 | 3-1 | 3 | 4-1 | Good |
| Example 3 | 1-1 | 2-1 | 2 | 3-1 | 0.5 | 4-1 | Good |
| Example 4 | 1-2 | 2-1 | 2 | 3-1 | 3 | 4-1 | Good |
| Example 5 | 1-3 | 2-1 | 2 | 3-1 | 3 | 4-1 | Good |
| Example 6 | 1-6 | 2-1 | 2 | 3-1 | 3 | 4-1 | fair |
| Example 7 | 1-7 | 2-1 | 2 | 3-1 | 3 | 4-1 | fair |
| Example 8 | 1-8 | 2-1 | 2 | 3-1 | 3 | 4-1 | Good |
| Example 9 | 1-9 | 2-1 | 2 | 3-1 | 3 | 4-1 | fair |
| Example 10 | 1-10 | 2-1 | 2 | 3-1 | 3 | 4-1 | Good |
| Example 11 | 1-11 | 2-1 | 2 | 3-1 | 3 | 4-1 | Good |
| Example 12 | 1-12 | 2-1 | 2 | 3-1 | 3 | 4-1 | Good |
| Example 13 | 1-13 | — | 2 | 3-1 | 3 | 4-1 | fair |
| Example 14 | 1-1 | 2-2 | 2 | 3-1 | 3 | 4-1 | Good |
| Example 15 | 1-1 | 2-3 | 2 | 3-1 | 3 | 4-1 | Good |
| Example 16 | 1-1 | 2-4 | 2 | 3-1 | 3 | 4-1 | Good |
| Example 17 | 1-1 | 2-5 | 2 | 3-1 | 3 | 4-1 | Good |
| Example 18 | 1-1 | 2-6 | 2 | 3-1 | 3 | 4-1 | Good |
| Example 19 | 1-1 | 2-7 | 2 | 3-1 | 3 | 4-1 | Good |
| Example 20 | 1-1 | 2-8 | 2 | 3-1 | 3 | 4-1 | Good |
| Example 21 | 1-1 | 2-9 | 2 | 3-1 | 3 | 4-1 | Good |
| Example 22 | 1-1 | 2-10 | 2 | 3-1 | 3 | 4-1 | Good |

TABLE 5-continued

Table 5

| | | | | | | | |
|---|---|---|---|---|---|---|---|
| Example 23 | 1-1 | 2-11 | 2 | 3-1 | 3 | 4-1 | Good |
| Example 24 | 1-1 | 2-12 | 2 | 3-1 | 3 | 4-1 | Good |
| Example 25 | 1-1 | 2-13 | 2 | 3-1 | 3 | 4-1 | Good |
| Example 26 | 1-1 | 2-1 | 2 | 3-2 | 3 | 4-1 | Good |
| Example 27 | 1-1 | 2-1 | 2 | 3-3 | 3 | 4-1 | fair |
| Example 28 | 1-1 | 2-1 | 2 | 3-4 | 3 | 4-1 | fair |
| Example 29 | 1-1 | 2-1 | 2 | 3-5 | 3 | 4-1 | fair |
| Example 30 | 1-1 | 2-1 | 2 | 3-6 | 3 | 4-1 | fair |
| Example 31 | 1-1 | 2-1 | 2 | 3-7 | 3 | 4-1 | Good |
| Example 32 | 1-1 | 2-1 | 2 | 3-8 | 3 | 4-1 | Good |
| Example 33 | 1-1 | 2-1 | 2 | 3-9 | 3 | 4-1 | Good |
| Example 34 | 1-1 | 2-1 | 2 | 3-1 | 3 | 4-2 | Good |
| Example 35 | 1-1 | 2-1 | 2 | 3-1 | 3 | 4-3 | fair |
| Example 36 | 1-1 | 2-1 | 2 | 3-1 | 3 | 4-4 | fair |
| Example 37 | 1-1 | 2-1 | 2 | 3-1 | 3 | 4-5 | fair |
| Example 38 | 1-1 | 2-1 | 2 | 3-1 | 3 | 4-6 | Good |
| Example 39 | 1-1 | 2-1 | 2 | 3-1 | 3 | 4-7 | fair |
| comperative ex. 1 | 1-1 | 2-1 | 2 | N/A | 3 | 4-1 | NG |
| comparative ex. 2 | 1-4 | 2-1 | 2 | 3-1 | 3 | 4-1 | Good |
| comparative ex. 3 | 1-5 | 2-1 | 2 | 3-1 | 3 | 4-1 | NG |
| comparative ex. 4 | N/A | — | — | N/A | 3 | 4-1 | Good |

| | | Reinforcing performance | | | | | |
|---|---|---|---|---|---|---|---|
| | alkali proof | workability | concret adhesiveness [N/mm³] | FRP strength [kN/m] | converted FRP strength [kN/m] | gas toxicity [min.] | flame propagation |
| Example 1 | Good | Good | Good 4.6 | Good 191 | Good 382 | Good 7.6 | Good |
| Example 2 | Good | Good | Good 3.8 | Good 191 | fair 191 | Good 7.3 | Good |
| Example 3 | Good | fair | Good 4.6 | Good 210 | Good 420 | Good 8.5 | Good |
| Example 4 | Good | Good | Good 4.2 | Good 197 | Good 309 | Good 7.8 | Good |
| Example 5 | Good | Good | Good 3.4 | Good 188 | Good 376 | Good 7.9 | Good |
| Example 6 | Good | Good | Good 3.5 | Good 190 | Good 380 | Good 7.9 | Good |
| Example 7 | Good | Good | Good 3.1 | Good 184 | Good 368 | Good 8.0 | Good |
| Example 8 | Good | fair | Good 4.3 | fair 160 | fair 320 | fair 6.9 | Good |
| Example 9 | Good | Good | Good 3.0 | fair 153 | fair 306 | Good 8.8 | Good |
| Example 10 | Good | Good | fair 1.8 | Good 200 | Good 400 | Good 9.8 | Good |
| Example 11 | Good | Good | Good 5.2 | Good 194 | Good 388 | fair 7.1 | fair |
| Example 12 | Good | fair | Good 4.9 | Good 192 | Good 384 | Good 7.7 | Good |
| Example 13 | Good | Good | Good 4.2 | fair 161 | fair 322 | fair 6.8 | fair |
| Example 14 | Good | Good | Good 3.4 | Good 192 | Good 384 | Good 7.6 | Good |
| Example 15 | Good | Good | Good 3.9 | Good 192 | Good 384 | Good 7.6 | Good |
| Example 16 | Good | Good | Good 3.6 | Good 195 | Good 390 | Good 7.6 | Good |
| Example 17 | Good | Good | Good 3.5 | Good 192 | Good 384 | Good 7,7 | Good |
| Example 18 | Good | Good | Good 3.7 | Good 184 | Good 368 | Good 8.0 | Good |
| Example 19 | fair | Good | Good 4.0 | Good 188 | Good 376 | Good 7.5 | Good |
| Example 20 | fair | Good | Good 4.2 | Good 189 | Good 378 | Good 7.5 | Good |
| Example 21 | fair | Good | Good 5.1 | Good 176 | Good 352 | Good 7.7 | Good |
| Example 22 | fair | Good | Good 3.7 | Good 211 | Good 422 | Good 7.8 | Good |
| Example 23 | fair | Good | Good 4.4 | Good 191 | Good 382 | Good 7.5 | Good |
| Example 24 | fair | Good | Good 4.7 | Good 184 | Good 368 | Good 7.4 | Good |
| Example 25 | fair | Good | Good 3.9 | Good 177 | Good 354 | Good 7.7 | Good |
| Example 26 | Good | Good | Good 4.0 | Good 190 | Good 380 | Good 7.7 | Good |
| Example 27 | Good | Good | Good 4.2 | Good 192 | Good 384 | Good 7.6 | Good |
| Example 28 | Good | Good | Good 4.4 | Good 190 | Good 377 | Good 8.4 | Good |
| Example 29 | Good | Good | Good 4.4 | Good 214 | Good 428 | fair 6.9 | Good |
| Example 30 | Good | Good | Good 4.2 | Good 175 | Good 350 | Good 8.0 | Good |
| Example 31 | Good | Good | Good 4.2 | Good 192 | Good 384 | Good 7.5 | Good |
| Example 32 | Good | Good | Good 4.0 | Good 190 | Good 380 | Good 7.7 | Good |
| Example 33 | Good | Good | Good 4.3 | Good 189 | Good 378 | Good 7.4 | Good |
| Example 34 | Good | Good | Good 4.1 | Good 199 | Good 398 | Good 7.2 | Good |
| Example 35 | Good | Good | Good 3.9 | Good 183 | Good 366 | fair 7.1 | Good |
| Example 36 | Good | Good | Good 4.0 | Good 186 | Good 372 | Good 7.3 | fair |
| Example 37 | Good | Good | Good 4.1 | Good 190 | Good 380 | fair 6.9 | Good |
| Example 38 | Good | Good | Good 3.7 | Good 190 | Good 380 | Good 7.3 | Good |
| Example 39 | Good | Good | Good 3.7 | Good 192 | Good 384 | fair 7.1 | fair |
| comparative ex. 1 | Good | Good | Good 4.4 | Good 220 | Good 240 | Good 7.2 | Good |
| comparative ex. 2 | Good | Good | Good 4.9 | NG 134 | NG 268 | Good 7.9 | Good |
| comparative ex. 3 | Good | Good | Good 3.6 | Good 191 | Good 382 | Good 7.7 | Good |

TABLE 5-continued

Table 5

| | | | | | | | | |
|---|---|---|---|---|---|---|---|---|
| comparative ex. 4 | Good | Good | | Good 5.4 | NG (†1) | NG (†1) | NG 6.1 | NG |

(†1) unable to form FRP.

As seen from Table 5, all the examples have demonstrated excellent to good reinforcing performance. On the other hand, Comparative Examples 1 and 3 had a defect in the visibility of the base. In Comparative Example 2, the FRP strength was insufficient. Comparative Example 4 was not able to form a FRP structure. Accordingly, all the comparative examples were unbearable for the practical use of the reinforcement method.

The present invention can reinforce a concrete structure such as an existing concrete structure.

The invention claimed is:

1. A fiber sheet for reinforcing a concrete structure, the sheet comprising:
  a framework in which a filament-based, multi-axial mesh sheet and a matrix resin are integrated,
  wherein the multi-axial mesh sheet has a base weight amount in a range of 500 g/m² to 1000 g/m², and
  wherein the multi-axial mesh sheet is a glass fiber sheet of two or more axes, and wherein the glass fiber sheet at least contains:
  12% or more by mass of $ZrO_2$, and
  10% or more by mass of $R_2O$, where R is one or more selected from the group consisting of Li, Na, and K.

2. The fiber sheet according to claim 1, wherein the multi-axial mesh sheet has a mesh opening of 1 to 25 mm.

3. The fiber sheet according to claim 1, wherein the multi-axial mesh sheet comprises a thermoplastic resin in at least one of the axial directions.

4. The fiber sheet according to claim 3, wherein the multi-axial mesh sheet comprises the thermoplastic resin in an amount of 50 g/m² or less.

5. The fiber sheet according to claim 1, wherein the matrix resin comprises 50% by mass or more of a component including one or more selected from the group consisting of (meth)acrylic resin, vinyl ester resin, unsaturated polyester resin, urethane resin, urea resin, epoxy resin, and silicone resin.

6. The fiber sheet according to claim 1, wherein an amount of the matrix resin is 20 g/m² to 400 g/m².

7. The fiber sheet according to claim 1, wherein a difference between refractive indices of the multi-axial mesh sheet and the matrix resin is 0.04 or less, as measured by using a 589 nm-wavelength light source according to "Method A" defined in Section 4.1 of JIS K 7142: 2014.

8. The fiber sheet according to claim 1, wherein the fiber sheet has a mesh opening of 1 to 25 mm.

9. The fiber sheet according to claim 1, which additionally has an adhesive applied thereto, thereby forming a reinforcing layer on the sheet.

10. A method for manufacturing a fiber sheet for reinforcing a concrete structure, the method comprising the steps of:
  impregnating a matrix resin into a filament-based, multi-axial mesh sheet, wherein the multi-axial mesh sheet has a base weight amount in a range of 500 g/m² to 1000 g/m²; and
  curing and/or immobilizing the impregnated matrix resin by heat treatment and/or active energy ray irradiation treatment such that the multi-axial mesh sheet and the matrix resin are integrated into a fiber sheet.

11. The method according to claim 10, wherein the matrix resin is a non-polymerizable high molecular weight substance, the method further comprising the steps of:
  diluting the high molecular matrix resin with an organic solvent, wherein the organic solvent is capable of dissolving the matrix resin; and
  after the impregnating the matrix resin into the multi-axial mesh sheet, volatilizing the organic solvent by heat treatment.

12. The method according to claim 10, wherein the matrix resin is a radical polymerizable resin, the method further comprising the steps of:
  adding a thermal polymerization initiator to the matrix resin, wherein the thermal polymerization initiator is capable of generating a radical by heating; and
  after the impregnating the matrix resin into the multi-axial mesh sheet, radically polymerizing the matrix resin by heat treatment.

13. The method according to claim 10, wherein the matrix resin is a radical polymerizable resin, the method further comprising the steps of:
  adding a photopolymerization initiator to the matrix resin wherein the photopolymerization initiator is capable of generating a radical by irradiating an active energy ray; and
  after the impregnating the matrix resin into the multi-axial mesh sheet, radically polymerizing the matrix resin by active energy ray irradiation treatment.

14. The method according to claim 10, further comprising:
  winding the fiber sheet into a roll.

15. A method for reinforcing a concrete structure, the method comprising the steps of:
  applying an adhesive for concrete onto the fiber sheet according to claim 1 or a fiber sheet obtained by the method for manufacturing a fiber sheet for reinforcing a concrete structure comprising the steps of:
    impregnating a matrix resin into a filament-based, multi-axial mesh sheet, wherein the multi-axial mesh sheet has a base weight amount in a range of 500 g/m² to 1000 g/m²; and
    curing and/or immobilizing the impregnated matrix resin by heat treatment and/or active energy ray irradiation treatment such that the multi-axial mesh sheet and the matrix resin are integrated into a fiber sheet; and
  installing the fiber sheet on a surface of a concrete structure, then curing the adhesive to form a reinforcing layer on the surface, wherein the reinforcing layer has a tensile strength of 150 kN/m or more per unit length, as measured by using a "B-type specimen" prepared by a process based on JIS A 1191: 2004.

16. The method according to claim 15, wherein the reinforcing layer has a total light transmittance of 5% or more, as measured by a process defined in JIS K 7375: 2008.

17. The method according to claim 15, wherein a difference between refractive indices of the multi-axial mesh sheet and the adhesive is 0.04 or less, as measured by using a 589 nm-wavelength light source according to "Method A" defined in Section 4.1 of JIS K 7142: 2014.

18. The method according to claim 15, wherein the adhesive comprises 50% by mass or more of a component including one or more selected from the group consisting of (meth)acrylic resin, vinyl ester resin, unsaturated polyester resin, urethane resin, urea resin, epoxy resin, and silicone resin.

* * * * *